US012612197B2

(12) United States Patent
Aizawa

(10) Patent No.: US 12,612,197 B2
(45) Date of Patent: Apr. 28, 2026

(54) FLYING OBJECT CONTROLLER, FLYING OBJECT, FLYING OBJECT CONTROL METHOD, PROGRAM, AND NON-TRANSITORY COMPUTER-READABLE STORAGE MEDIUM

(71) Applicant: HONDA MOTOR CO., LTD., Tokyo (JP)

(72) Inventor: Bon Aizawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/905,722

(22) Filed: Oct. 3, 2024

(65) Prior Publication Data

US 2025/0115381 A1     Apr. 10, 2025

(30) Foreign Application Priority Data

Oct. 6, 2023     (JP) ................................. 2023-173942

(51) Int. Cl.
　　*B64U 40/10*　　　(2023.01)
　　*B64U 10/16*　　　(2023.01)
(52) U.S. Cl.
　　CPC ............. *B64U 40/10* (2023.01); *B64U 10/16* (2023.01); *B64U 2201/20* (2023.01)
(58) Field of Classification Search
　　CPC .... B64U 40/10; B64U 10/16; B64U 2201/20; B64C 29/0025
　　See application file for complete search history.

(56) References Cited

U.S. PATENT DOCUMENTS

| | | | | |
|---|---|---|---|---|
| 3,089,666 | A * | 5/1963 | Quenzler | ............ B64C 29/0033 244/66 |
| 4,841,448 | A * | 6/1989 | Ford | .................... G05D 1/0623 701/506 |
| 5,765,777 | A * | 6/1998 | Schmittle | ................ B64C 39/04 244/181 |
| 6,293,491 | B1 * | 9/2001 | Wobben | ............... B64D 35/022 244/17.23 |
| 8,485,464 | B2 * | 7/2013 | Kroo | ....................... B64C 29/00 244/6 |
| 9,120,560 | B1 * | 9/2015 | Armer | .................... B64U 30/20 |
| 9,242,738 | B2 * | 1/2016 | Kroo | ....................... B64C 39/12 |
| 9,944,387 | B2 * | 4/2018 | Vander Lind | ........... B64C 27/26 |
| 10,054,939 | B1 * | 8/2018 | Applewhite | ........... B64U 10/10 |
| 10,131,426 | B2 * | 11/2018 | Judas | ........................ B64C 3/38 |
| 10,518,875 | B2 * | 12/2019 | Judas | .................... B64U 10/20 |
| 10,577,091 | B2 * | 3/2020 | Parks | .................... B64C 27/26 |
| 10,676,176 | B1 * | 6/2020 | Piedmonte | .......... B64C 29/0025 |
| 10,787,255 | B2 * | 9/2020 | George | .................... B64C 3/38 |
| 11,066,161 | B2 * | 7/2021 | Mermoz | ............... B64D 27/33 |
| 11,124,286 | B1 * | 9/2021 | Piedmonte | ............. B64U 10/20 |

(Continued)

*Primary Examiner* — Medhat Badawi
(74) *Attorney, Agent, or Firm* — Rankin, Hill & Clark LLP

(57) ABSTRACT

A flying object controller for controlling a flying object comprises a control unit configured to perform control that moves a slider along a rotor shaft provided at a rotor by expanding/contracting a plurality of actuators, and a judgment unit configured to judge whether the slider has contacted or is likely to contact the rotor shaft, and wherein when the judgment unit judges that the slider has contacted or is likely to contact the rotor shaft, the control unit performs correction control that prevents the slider from contacting the rotor shaft.

18 Claims, 7 Drawing Sheets

(56) References Cited

U.S. PATENT DOCUMENTS

| | | | | |
|---|---|---|---|---|
| 11,643,199 | B2 * | 5/2023 | Melo | B64C 3/16 244/6 |
| 11,708,157 | B2 * | 7/2023 | Graves | B64C 27/68 244/6 |
| 12,286,250 | B2 * | 4/2025 | Suzuki | B64C 29/0033 |
| 2011/0150645 | A1 * | 6/2011 | Moore | B64C 11/003 416/1 |
| 2013/0092799 | A1 * | 4/2013 | Tian | B64C 39/10 244/7 R |
| 2014/0091172 | A1 * | 4/2014 | Arlton | B64U 50/19 244/17.23 |
| 2015/0314867 | A1 * | 11/2015 | Razroev | B64C 39/12 244/119 |
| 2016/0207625 | A1 * | 7/2016 | Judas | B64C 29/0025 |
| 2017/0225779 | A1 * | 8/2017 | Gamble | B64D 27/33 |
| 2017/0274978 | A1 * | 9/2017 | Beckman | B64U 50/13 |
| 2017/0274979 | A1 * | 9/2017 | Beckman | B64C 11/48 |
| 2018/0105267 | A1 * | 4/2018 | Tighe | B64C 27/08 |
| 2018/0105279 | A1 * | 4/2018 | Tighe | B64D 29/02 |
| 2018/0118335 | A1 * | 5/2018 | Gamble | H02K 11/21 |
| 2018/0208305 | A1 * | 7/2018 | Lloyd | B60L 50/90 |
| 2018/0222577 | A1 * | 8/2018 | Goldman | B64C 29/0033 |
| 2018/0362146 | A1 * | 12/2018 | Klein | B64U 10/13 |
| 2019/0127056 | A1 * | 5/2019 | Weekes | B64C 39/12 |
| 2019/0179344 | A1 * | 6/2019 | Qu | G05D 1/0094 |
| 2019/0337613 | A1 * | 11/2019 | Villa | B64C 23/00 |
| 2020/0023956 | A1 * | 1/2020 | Bredenbeck | B64C 11/40 |
| 2020/0079501 | A1 * | 3/2020 | Graves | B64U 50/19 |
| 2020/0198761 | A1 * | 6/2020 | Tao | B64C 39/024 |
| 2020/0333779 | A1 * | 10/2020 | Regev | G05D 1/223 |
| 2020/0354048 | A1 * | 11/2020 | Melo | B64C 25/52 |
| 2022/0219815 | A1 * | 7/2022 | Ciripompa | B64C 11/32 |
| 2023/0106432 | A1 * | 4/2023 | Baumgartner | G05D 1/221 701/2 |
| 2023/0271710 | A1 * | 8/2023 | Verna | B64U 50/19 310/114 |
| 2023/0294828 | A1 * | 9/2023 | Arlton | B64C 39/024 244/17.23 |
| 2023/0348080 | A1 * | 11/2023 | Colbourn | H02K 7/106 |
| 2023/0406551 | A1 * | 12/2023 | Dao | B64U 10/13 |
| 2024/0067330 | A1 * | 2/2024 | Brookes | B64C 19/00 |
| 2024/0076039 | A1 * | 3/2024 | Takahama | B64U 10/13 |
| 2024/0116628 | A1 * | 4/2024 | Beno | H02K 15/03 |
| 2024/0124127 | A1 * | 4/2024 | Brookes | B64C 11/44 |
| 2024/0300643 | A1 * | 9/2024 | Aizawa | B64D 31/16 |
| 2024/0326983 | A1 * | 10/2024 | Brookes | B64D 35/021 |
| 2024/0327013 | A1 * | 10/2024 | Brookes | B64C 29/0025 |
| 2024/0400213 | A1 * | 12/2024 | Vaidya | B64D 31/16 |
| 2025/0066028 | A1 * | 2/2025 | Beno | F16B 2/06 |
| 2025/0115381 | A1 * | 4/2025 | Aizawa | B64C 29/0025 |

* cited by examiner

FIG. 1

START

DETERMINE ATTITUDE OF FUSELAGE | S1

SET PITCH ANGLE OF BLADE | S2

SET TARGET LENGTH OF ACTUATOR | S3

OUTPUT EXPANSION-CONTRACTION COMMAND TO ACTUATOR | S4

SLIDER HAS CONTACTED ROTOR SHAFT? OR SLIDER IS LIKELY TO CONTACT ROTOR SHAFT? | S5 — NO

YES

CORRECTIVE CONTROL | S6

EXPANSION AND CONTRACTION OF ACTUATOR IS COMPLETED? | S7 — NO

YES

END

FLYING OBJECT CONTROLLER, FLYING OBJECT, FLYING OBJECT CONTROL METHOD, PROGRAM, AND NON-TRANSITORY COMPUTER-READABLE STORAGE MEDIUM

CROSS-REFERENCE TO RELATED APPLICATIONS

This application is based upon and claims the benefit of priority from Japanese Patent Application No. 2023-173942 filed on Oct. 6, 2023, the contents of which are incorporated herein by reference.

BACKGROUND OF THE INVENTION

Field of the Invention

The present invention relates to a flying object controller, a flying object, a method for controlling a flying object, a program, and a computer-readable non-transitory storage medium.

Description of the Related Art

US 2020/0079501 A1 discloses a controller for an aircraft.

SUMMARY OF THE INVENTION

More advanced flying object control is urgently needed recently.

An objective of the present invention is to solve the aforementioned problem.

A first aspect of the present invention is a flying object controller for controlling a flying object equipped with an actuator for adjusting a pitch angle of a blade provided at a rotor, the flying object controller comprising: a control unit configured to control a movement of a slider along a rotor shaft provided at the rotor by expanding and contracting a plurality of the actuators; a judgment unit configured to judge whether the slider has contacted or is likely to contact the rotor shaft, wherein the control unit performs corrective control that prevents the slider from contacting the rotor shaft when the judgment unit judges that the slider has contacted or is likely to contact the rotor shaft.

A second aspect of the present invention is a flying object including the flying object controller according to the first aspect.

A third aspect of the present invention is a method for controlling a flying object equipped with an actuator for adjusting a pitch angle of a blade provided at a rotor, the control method comprising: a moving step of moving a slider along a rotor shaft provided at the rotor by expanding and contracting a plurality of actuators; a judgment step for judging whether the slider has contacted or is likely to contact the rotor shaft; and a correction step for performing corrective control that prevents the slider from contacting the rotor shaft when it is judged in the judgment step that the slider has contacted or is likely to contact the rotor shaft.

A fourth aspect of the present invention is a program that causes a computer to execute the method according to the third aspect.

A fifth aspect of the present invention is a non-transitory computer-readable storage medium storing the program according to the fourth aspect.

The present invention provides a good flying object controller, flying object, flying object control method, program, and non-transitory computer-readable storage medium.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a schematic diagram of a flying object.

DETAILED DESCRIPTION OF THE INVENTION

[Configuration of Flying Object]

Figure 1:
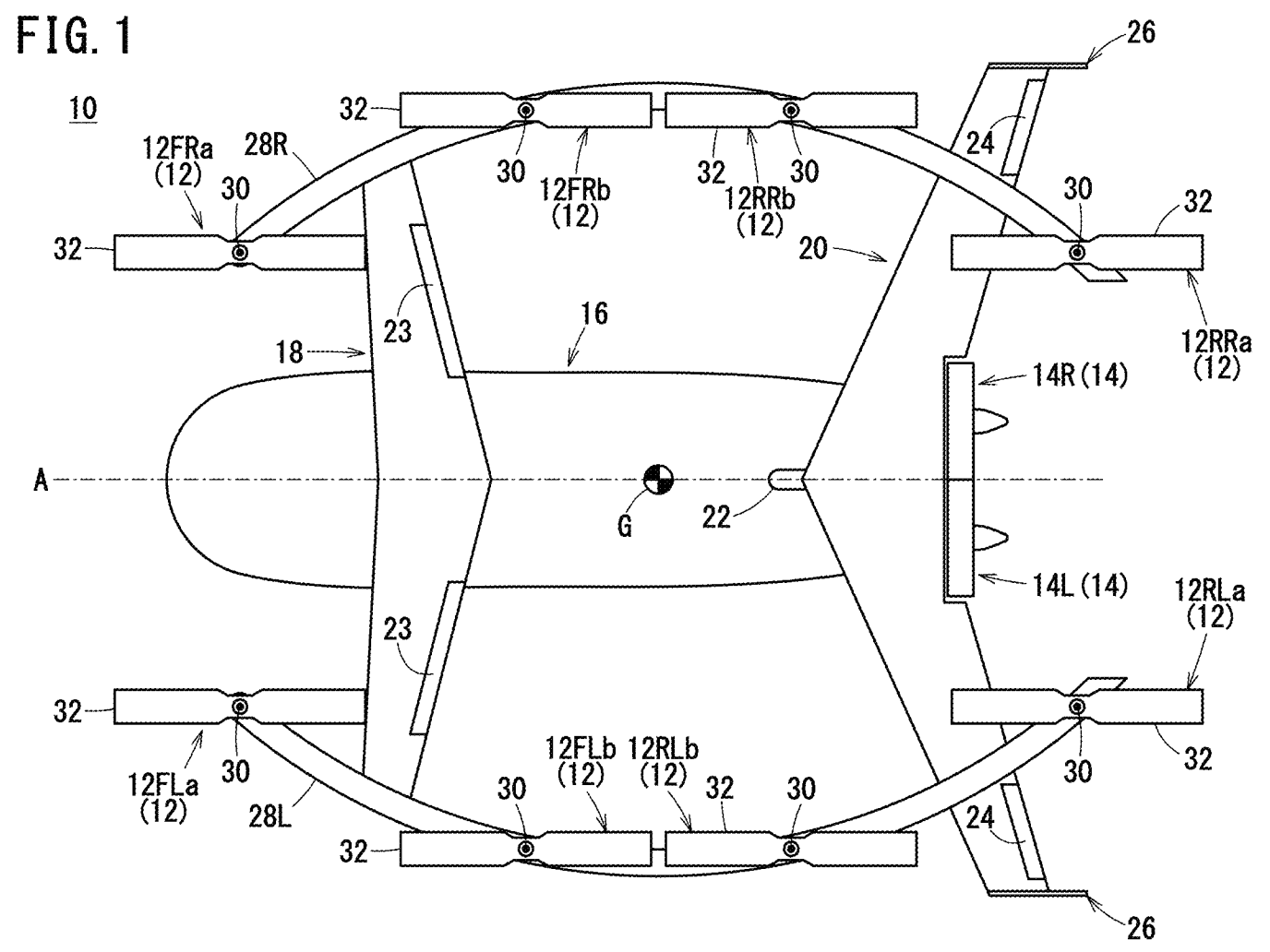
Figure 2:
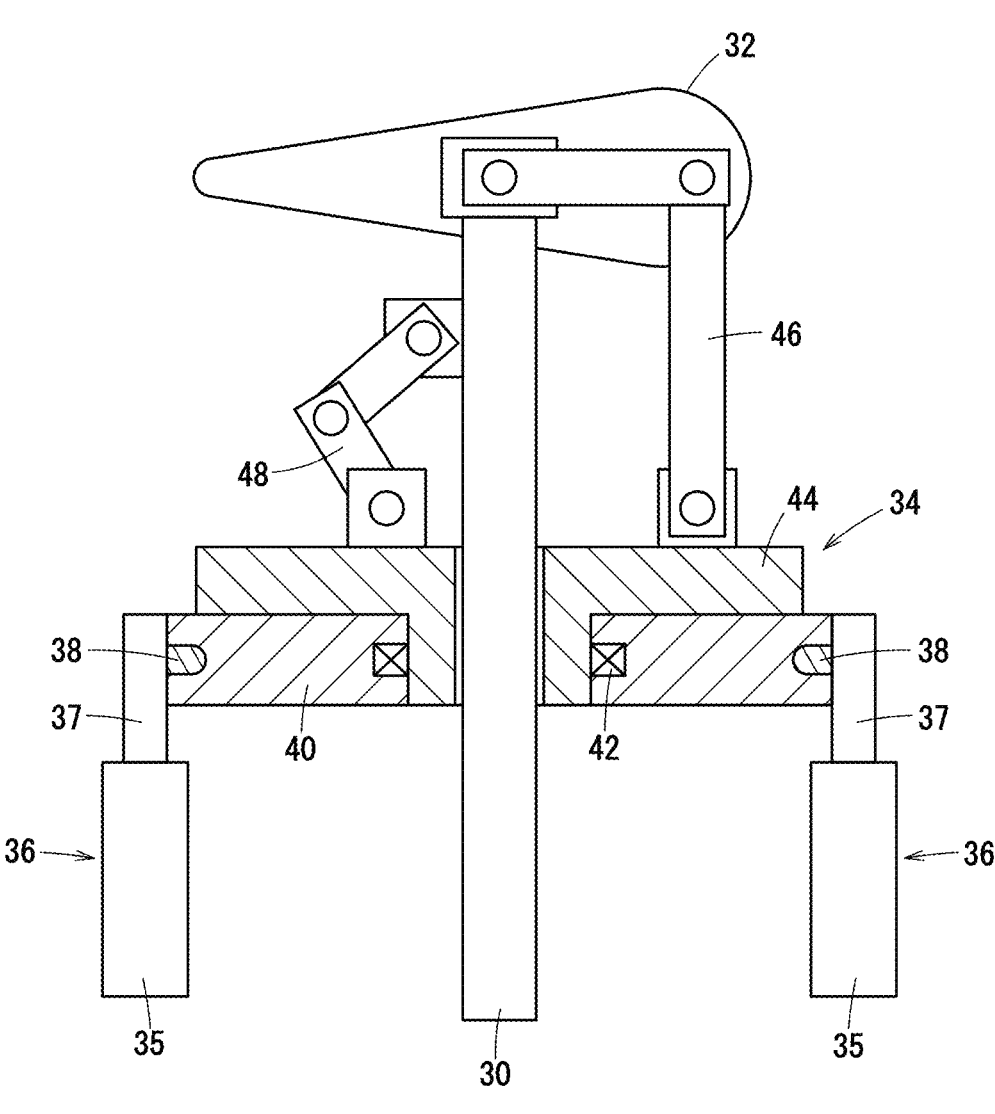
FIG. 2 is a schematic diagram of a collective pitch mechanism.

FIG. 1 is a schematic diagram of a flying object 10. The flying object 10 of the present embodiment is an electric vertical take-off and landing (eVTOL) aircraft. The flying object 10 of the present embodiment has eight VTOL rotors 12 and two cruise rotors 14. Rotation of the VTOL rotor 12 generates lift that moves a fuselage 16 upward. Rotation of the cruise rotor 14 generates thrust that moves the fuselage 16 forward.

The flying object 10 has the fuselage 16. The fuselage 16 is provided with a cockpit, a cabin, etc. In the cockpit, pilots are on board and control the flying object 10. Passengers and the like are on board in the cabin. The flying object 10 may be automatically steered without a pilot on board.

The flying object 10 has a front wing 18 and a rear wing 20 that are fixed wings. The front wing 18 is attached to an upper part of the fuselage 16 in front of the center of gravity G. The rear wing 20 is connected to an upper part of the fuselage 16 via a pylon 22 at a position further rearward than the center of gravity G. When the fuselage 16 has an airspeed, the angles of attack of the front wing 18 and the rear wing 20 are adjusted, whereby lift is generated at the front wing 18 and the rear wing 20.

The front wing 18 has two elevators 23 at the trailing edge. The rear wing 20 has two elevon 24 at the trailing edge. The rear wing 20 has two vertical stabilizer 26 at the wing tips. The vertical stabilizer 26 has a ladder (not shown) at the trailing edge.

The elevator 23 is operated, whereby a pitch moment acts around the center of gravity G of the fuselage 16. The elevon 24 is operated, whereby a roll moment acts around the center of gravity G of the fuselage 16. The ladder is operated, whereby a yaw moment acts around the center of gravity G of the fuselage 16.

The flying object 10 has a boom 28L and a boom 28R. The boom 28L and the boom 28R are attached to the front wing 18 and the rear wing 20. The boom 28L and the boom 28R form a pair and are provided symmetrically with respect to a centerline A of the fuselage 16 passing through the center of gravity G.

The flying object 10 has eight VTOL rotors 12. The eight VTOL rotors 12 are a rotor 12FLa, a rotor 12FLb, a rotor 12RLa, a rotor 12RLb, a rotor 12FRa, a rotor 12FRb, a rotor 12RRa, and a rotor 12RRb.

The rotors 12FLa, 12FLb, 12RLa, and 12RLb are attached to the boom 28L, which is provided on the left side with respect to the center of gravity G of the fuselage 16. That is, the rotors 12FLa, 12FLb, 12RLa, and 12RLb are arranged on the left side with respect to the center of gravity G.

The rotors 12FRa, 12FRb, 12RRa, and 12RRb are attached to the boom 28R provided on the right side with respect to the center of gravity G of the fuselage 16. That is, the rotors 12FRa, 12FRb, 12RRa, and 12RRb are located on the right side with respect to the center of gravity G.

Each of the VTOL rotors 12 has a rotor shaft 30. The rotor shaft 30 extends in the up-down direction of the fuselage 16. The rotor shaft 30 may be angled (canted) several degrees with respect to the up-down direction of the fuselage 16.

Each of the VTOL rotors 12 has two blades 32. The number of blades 32 of the VTOL rotor 12 is not limited to two. At least one blade 32 of the VTOL rotor 12 is sufficient.

The rotation of the blade 32 with the rotor shaft 30 causes lift at the blade 32. The pitch angle of the blade 32 is adjusted, whereby the magnitude of the lift generated at the VTOL rotor 12 is adjusted. Mainly, the flying object 10 rotates the VTOL rotors 12 to generate lift at the time of vertical take-off, the transition from vertical take-off to cruising, the transition from cruising to vertical landing, the vertical landing, the hovering, and suchlike.

The magnitude of the lift generated at each of the eight VTOL rotors 12 is controlled, whereby the roll, pitch, and yaw moments act about the center of mass G of the fuselage 16.

A difference is created between the sum of the lift at each of the four VTOL rotors 12 arranged on the left side with respect to the center of mass G and the sum of the lift at each of the four VTOL rotors 12 arranged at the right side with respect to the center of mass G, whereby the roll moment is exerted about the center of mass G of the fuselage 16.

The four VTOL rotors 12 arranged on the left side with respect to the center of gravity G are rotor 12FLa, rotor 12FLb, rotor 12RLa, and rotor 12RLb. The four VTOL rotors 12 arranged on the right side with respect to the center of gravity G are rotor 12FRa, rotor 12FRb, rotor 12RRa and rotor 12RRb.

A difference is created between the sum of the lift at each of the four VTOL rotors 12 arranged on the front side with respect to the center of mass G and the sum of the lift at each of the four VTOL rotors 12 arranged on the rear side with respect to the center of mass G, whereby the pitch moment is exerted about the center of mass G of the fuselage 16.

The four VTOL rotors 12 arranged on the front side with respect to the center of gravity G are rotor 12FLa, rotor 12FLb, rotor 12FRa, and rotor 12FRb. The four VTOL rotors 12 arranged on the rear side with respect to the center of gravity G are rotor 12RLa, rotor 12RLb, rotor 12RRa, and rotor 12RRb.

The flying object 10 has two cruise rotors 14. The two cruise rotors 14 are a rotor 14L and a rotor 14R.

The rotor 14L and the rotor 14R are installed on a rear part of the fuselage 16. The rotor 14L is placed on the left side with respect to a centerline A of the fuselage 16. The rotor 14R is placed on the right side with respect to the centerline A of the fuselage 16.

A rotor shaft (not shown) of the cruise rotor 14 extends in the front-rear direction of the fuselage 16. The rotor shaft of the cruise rotor 14 may be angled (canted) several degrees with respect to the front-rear direction. Each of the cruise rotors 14 has one or more blades (not shown).

The rotation of the blades together with the rotor shaft generates thrust at the blades. The pitch angle of the blades is adjusted, whereby the magnitude of the thrust generated at the cruise rotor 14 is adjusted. Mainly, at the time of the transition from vertical take-off to cruising, the cruising, the transition from cruising to vertical landing, and the like, the flying object 10 rotates the cruise rotors 14 to generate thrust.

[Construction of Collective Pitch Mechanism]

Figure 3:
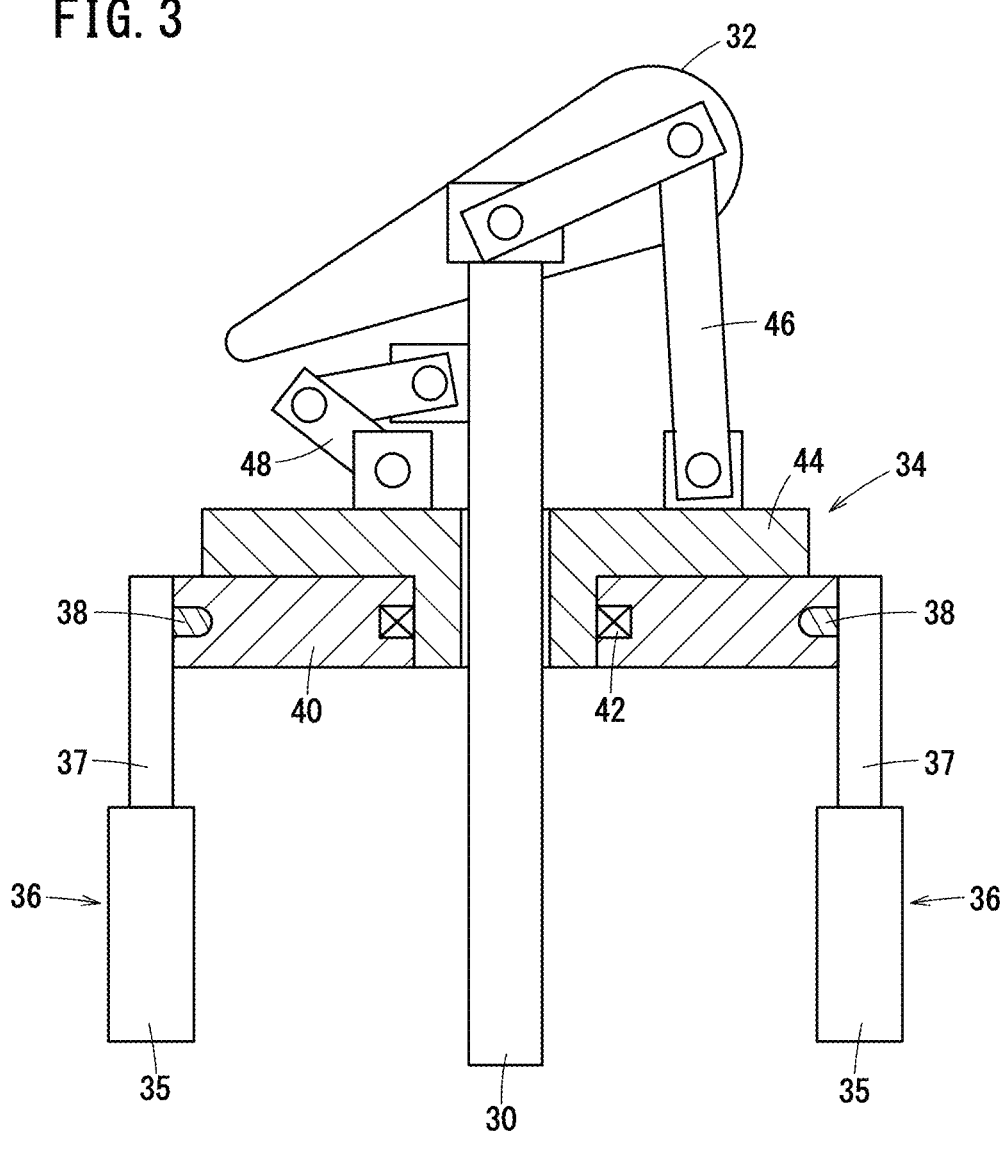
FIG. 3 is a schematic diagram of a collective pitch mechanism.

FIGS. 2 and 3 are schematic diagrams of a collective pitch mechanism 34. The collective pitch mechanism 34 adjusts the pitch angle of the blade 32 of the VTOL rotor 12. FIG. 3 shows a state in which a pitch angle of the blade 32 is larger than a pitch angle of the blade 32 shown in FIG. 2.

The collective pitch mechanism 34 includes an actuator 36, a stationary slider 40, a slider 44, a link rod 46, and a scissor link 48.

The collective pitch mechanism 34 of this embodiment has three actuators 36. In FIGS. 2 and 3, the collective pitch mechanism 34 is schematically shown and only two actuators 36 are illustrated. The actuator 36 has a cylinder 35 and a piston rod 37. A motor (not shown) moves the piston rod 37 relative to the cylinder 35, whereby the actuator 36 expands and contracts as a whole. The tip of the piston rod 37 is connected to the stationary slider 40 via a rod end 38. The expansion and contraction of the actuators 36 causes the stationary slider 40 to move along the rotor shaft 30.

The stationary slider 40 supports the slider 44 via a bearing 42. The slider 44 moves along the rotor shaft 30 together with the stationary slider 40. The slider 44 is connected to the blade 32 via the link rod 46. The pitch angle of the blade 32 changes with the movement of the slider 44. The slider 44 is connected to the rotor shaft 30 via the scissor link 48. The slider 44 rotates together with the rotor shaft 30 and the blade 32.

The pitch angle of the blade of the cruise rotor 14 may be adjusted by a mechanism similar to the collective pitch mechanism 34.

[Configuration of Flying Object Controller]

Figure 4:
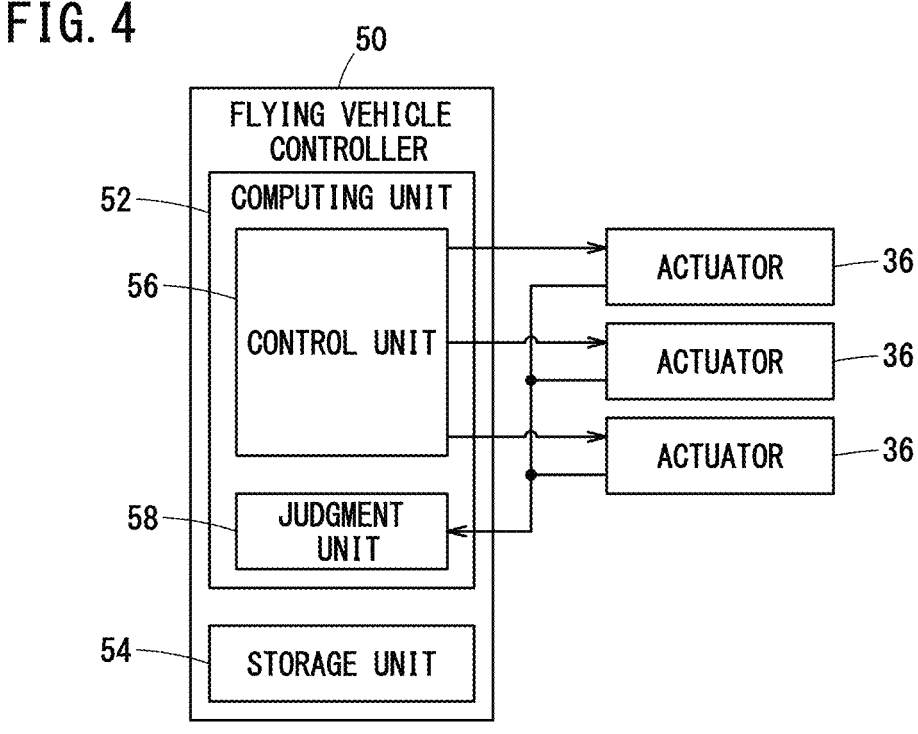
FIG. 4 is a block diagram showing the configuration of a flying object controller.

FIG. 4 is a block diagram showing the configuration of a flying object controller 50. The flying object controller 50 is installed in the flying object 10 and controls the flying object 10. The flying object controller 50 includes a computing unit 52 and a storage unit 54. The computing unit 52 is a processor such as a CPU (Central Processing Unit), a GPU (Graphics Processing Unit), or the like. The computing unit 52 includes a control unit 56 and a judgment unit 58. The computing unit 52 executes a program stored in the storage unit 54, whereby the control unit 56 and the judgment unit 58 are realized. At least part of the control unit 56 and the judgment unit 58 may be realized by an integrated circuit such as an ASIC (Application Specific Integrated Circuit), an FPGA (Field-Programmable Gate Array), and the like. At least part of the control unit 56 and the judgment unit 58 may be realized by an electronic circuit including a discrete device.

The storage unit 54 is a non-transitory computer-readable tangible storage medium. The storage unit 54 is made up of volatile memory (not shown) and nonvolatile memory (not shown). The volatile memory is, for example, a RAM (Random Access Memory) or the like. The nonvolatile memory is, for example, ROM (Read Only Memory), flash memory, etc. Data and the like are stored, for example, in volatile memory. Programs, tables, maps, etc. are stored, for example, in non-volatile memory. At least part of the storage unit 54 may be provided in the above-mentioned processor, integrated circuit, etc.

The control unit 56 controls each actuator 36 of the collective pitch mechanism 34. The control unit 56 determines the attitude of the fuselage 16 and sets the pitch angle of the blade 32 of each VTOL rotor 12 based on the determined attitude of the fuselage 16. The attitude of the fuselage 16 may be determined based on a pilot's flying. In the case of autopilot, the attitude of the fuselage 16 may be determined based on signals from other flying controllers.

The control unit 56 sets a target length of the actuator 36 based on the pitch angle of the blade 32. At the collective pitch mechanism 34, because the control of tilting the stationary slider 40 with respect to the rotor shaft 30 is not performed, the target lengths set for the three actuators 36 of each VTOL rotor 12 are all the same length.

When the pitch angle of the blade 32 is to be changed, the control unit 56 expands or contracts the actuators 36. When the later-described corrective control is not performed, the control unit 56 stretches or contracts the actuators 36 at the maximum speed within the range of the rated current, voltage, etc., and controls the actuator 36 to realize the target length at the fastest speed. This allows the collective pitch mechanism 34 to quickly adjust the pitch angle of the blade 32.

Until the judgment unit 58 judges that the slider 44 has contacted or is likely to contact the rotor shaft 30, the control unit 56 does not perform a cooperative control for the three actuators 36 but controls the three actuators 36 individually.

Since the three actuators 36 are controlled individually, the length of each actuator 36 may be different from the length of the other actuators 36 during the extension or contraction of each actuator 36. This causes the slider 44 to tilt together with the stationary slider 40, and there is a possibility that the slider 44 may come into contact with the rotor shaft 30.

The judgment unit 58 judges whether the slider 44 has contacted the rotor shaft 30 or is likely to contact the rotor shaft 30, based on the information sent from each actuator 36. When the judgment unit 58 has judged that the slider 44 contacted the rotor shaft 30 or is likely to contact the rotor shaft 30, the control unit 56 performs corrective control (compensation control, contact avoidance control) so that the slider 44 does not contact the rotor shaft 30.

Figure 5:
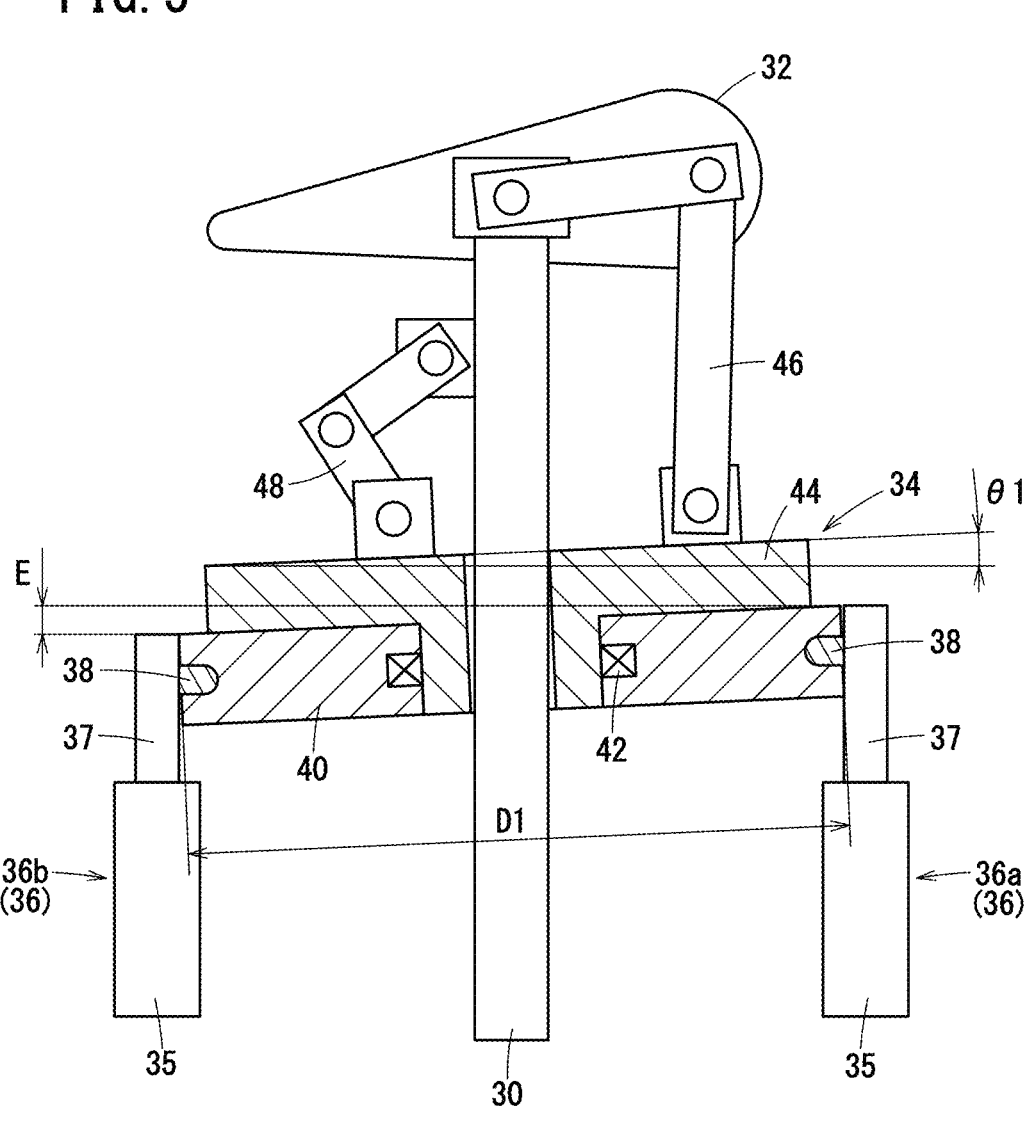
FIG. 5 is a diagram for explaining the judgment performed at a judgment unit.
Figure 6:
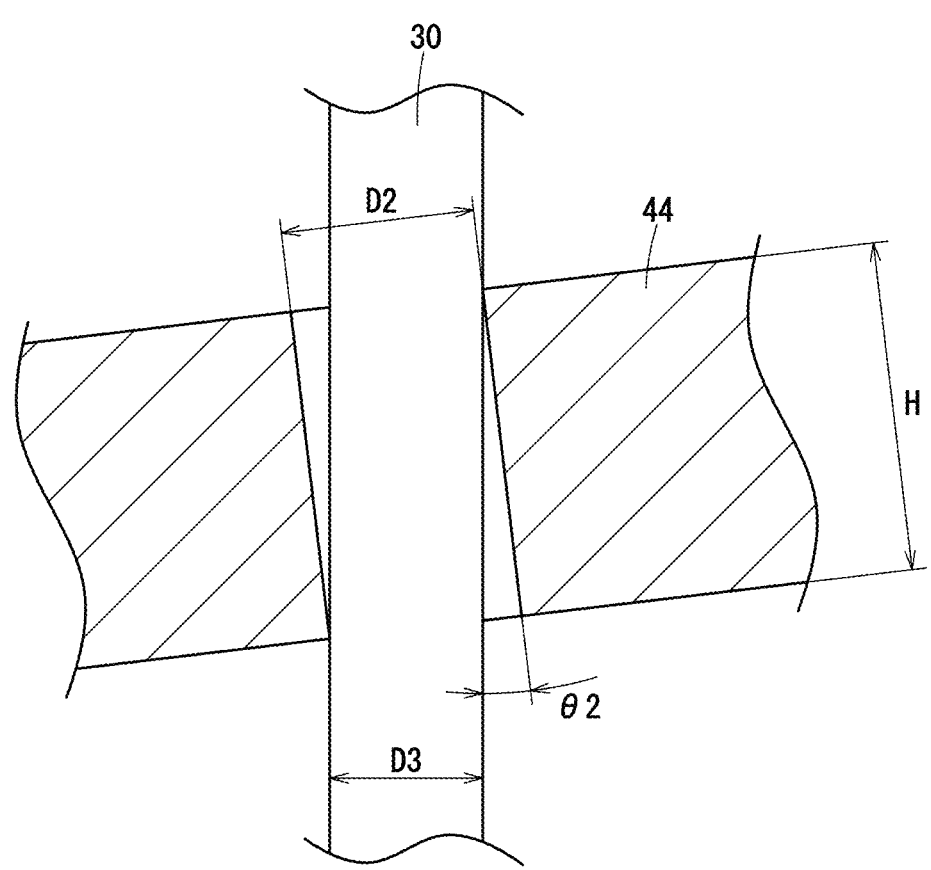
FIG. 6 is a diagram for explaining the judgment performed at the judgment unit.

FIGS. 5 and 6 are diagrams for explaining the judgment performed by the judgment unit 58. The judgment unit 58 judges whether the slider 44 has contacted the rotor shaft 30 or is likely to contact the rotor shaft 30. The inclination θ1 of the slider 44 shown in FIG. 5 can be expressed by the following equation (1). D1 in the equation (1) denotes the diameter of the outer periphery of the stationary slider 40. In the equation (1), E denotes the difference between the length of the actuator 36 that is longest and the length of the actuator 36 that is shortest. In the following, the actuator 36 in the longest state may be referred to as the longest actuator 36*a*. In the following, the actuator 36 in the shortest state may be referred to as the shortest actuator 36*b*.

$$\theta 1 = \arcsin(E/D1) \tag{1}$$

As shown in FIG. 6, the inclination of the slider 44 when the slider 44 is in contact with the rotor shaft 30 is denoted by θ2. The inclination θ2 can be expressed by the following equation (2). D2 in the equation (2) denotes the diameter of the inner periphery of the slider 44. D3 in the equation (2) denotes the diameter of the rotor shaft 30. H in the equation (2) denotes the height of the slider 44.

$$\theta 2 = \arctan\bigl((D2 - D3)/H\bigr) \tag{2}$$

When the inclination θ1 of the slider 44 is smaller than the inclination θ2, the slider 44 does not contact the rotor shaft 30. When the condition shown in the following inequality (3) is satisfied, the judgment unit 58 judges that the slider 44 has contacted the rotor shaft 30 or is likely to contact the rotor shaft 30. When the condition shown in the following inequality (3) is not satisfied, the judgment unit 58 judges that the slider 44 does not contact the rotor shaft 30. δ1 in the inequality (3) is a predetermined value that is determined in advance.

$$\theta 2 - \theta 1 \le \delta 1 \tag{3}$$

Because the values of D1, D2, D3, and H are fixed values, the judgment unit 58 may judge, based on the value of E, whether the slider 44 has contacted the rotor shaft 30 or is likely to contact the rotor shaft 30. In this case, when the condition shown in the following inequality (4) is satisfied, the judgment unit 58 judges that the slider 44 has contacted the rotor shaft 30 or is likely to contact the rotor shaft 30. When the condition shown in the following inequality (4) is not satisfied, the judgment unit 58 judges that the slider 44 does not contact the rotor shaft 30. δ2 in the inequality (4) is a predetermined length that is determined in advance.

$$E \ge \delta 2 \tag{4}$$

Because the values of D1, D2, D3, and H are fixed values, the judgment unit 58 may judge, based on the value of θ1, whether the slider 44 has contacted the rotor shaft 30 or is likely to contact the rotor shaft 30. In this case, if the condition shown in the following inequality (5) is satisfied, the judgment unit 58 judges that the slider 44 has contacted the rotor shaft 30 or is likely to contact the rotor shaft 30. When the condition shown in the following inequality (5) is not satisfied, the judgment unit 58 judges that the slider 44 does not contact the rotor shaft 30. δ3 in the inequality (5) is a predetermined angle that is determined in advance.

$$\theta 1 \ge \delta 3 \tag{5}$$

[Collective Pitch Control Process]

Figure 7:
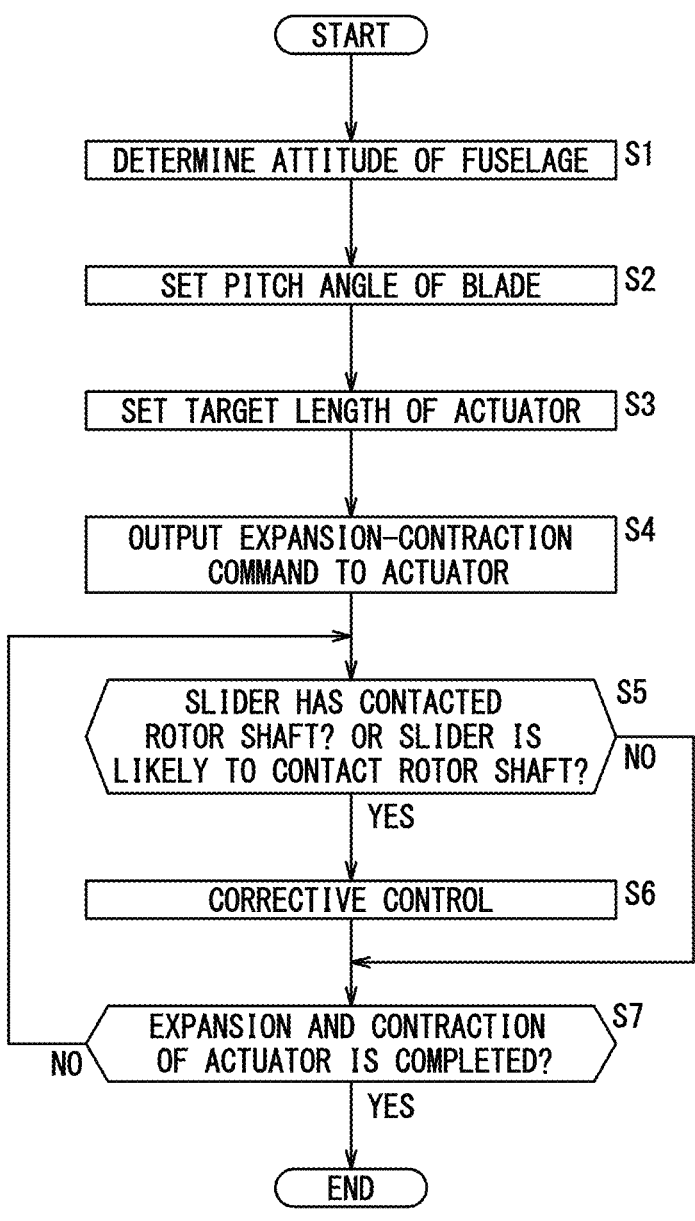
FIG. 7 is a flowchart of a collective pitch control process executed at the flying object controller.

FIG. 7 is a flowchart of the collective pitch control process executed at the flying object controller 50.

In step S1, the control unit 56 determines the attitude of the fuselage 16. Then, the process proceeds to step S2.

In step S2, the control unit 56 sets the pitch angle of the blades 32 of each VTOL rotor 12 based on the determined attitude of the fuselage 16. Then, the process proceeds to step S3.

In step S3, the control unit 56 sets the target length of the actuator 36 based on the set pitch angle of the blade 32 of each VTOL rotor 12. Then, the process proceeds to step S4.

In step S4, the control unit 56 outputs an expansion-contraction command to each actuator 36 so that each actuator 36 has a target length. Then, the process proceeds to step S5.

In step S5, the judgment unit 58 judges whether the slider 44 has contacted the rotor shaft 30 or the slider 44 is likely to contact the rotor shaft 30. When the judgment unit 58 judges that the slider 44 has contacted the rotor shaft 30 or the slider 44 is likely to contact the rotor shaft 30, the process proceeds to step S6. When the judgment unit 58 judges that the slider 44 does not contact the rotor shaft 30, the process proceeds to step S7.

In step S6, the control unit 56 executes the corrective control. When the corrective control is executed while the actuator 36 is extending, the control unit 56 slows down the extension speed of the longest actuator 36*a* for a predetermined time. When the corrective control is executed while the actuator 36 is extending, the control unit 56 may stop the longest actuator 36*a* for a predetermined time. When the corrective control is executed while the actuator 36 is contracting, the control unit 56 slows down the contraction speed of the shortest actuator 36*b* for a predetermined time. When the corrective control is executed while the actuator 36 is contracting, the control unit 56 may stop the shortest actuator 36*b* for a predetermined time.

In step S7, the control unit 56 judges whether the expansion and contraction of the actuator 36 is completed. When the control unit 56 judges that the expansion and contraction of the actuator 36 is completed, the collective pitch control process is terminated. If the control unit 56 judges that the expansion and contraction of the actuator 36 is not completed, the process returns to step S5.

With respect to the above disclosure, we further disclose the supplemental notes.

(Supplemental Note 1)

A flying object controller (50) for controlling a flying object (10) equipped with an actuator (36) for adjusting a pitch angle of a blade (32) provided at a rotor (12) comprises a control unit (56) configured to perform control that moves a slider (44) along a rotor shaft (30) provided at the rotor by expanding/contracting a plurality of the actuators, and a judgment unit (58) configured to judge whether the slider has contacted or is likely to contact the rotor shaft, wherein when the judgment unit judges that the slider has contacted or is likely to contact the rotor shaft, the control unit performs corrective control that prevents the slider from contacting the rotor shaft. According to such a configuration, the contact between the rotor shaft and the slider can be suppressed.

(Supplemental Note 2)

In respect of the flying object controller according to supplemental note 1, the judgment unit may judge that the slider has contacted or is likely to contact the rotor shaft when a difference between a length of a longest actuator (36*a*), which is an actuator in a longest state out of the plurality of actuators, and a length of a shortest actuator (36*b*), which is an actuator in a shortest state out of the plurality of actuators, is equal to or larger than a predetermined length. According to such a configuration, the judgment unit can accurately judge that the slider has contacted or is likely to contact the rotor shaft.

(Supplemental Note 3)

In respect of the flying object controller according to supplemental note 1, the judgment unit may judge that the slider has contacted or is likely to contact the rotor shaft when an inclination of the slider with respect to the rotor shaft is equal to or greater than a predetermined angle. According to such a configuration, the judgment unit can accurately judge that the slider has contacted or is likely to contact the rotor shaft.

(Supplemental Note 4)

In respect of the flying object controller according to supplemental note 1, in a case that it is judged that the slider has contacted or is likely to contact the rotor shaft, when the actuator is extending, the control unit may slow down the extending speed of the longest actuator, which is an actuator in a longest state out of the plurality of actuators, or stop the longest actuator. According to such a configuration, the contact between the rotor shaft and the slider can be suppressed.

(Supplemental Note 5)

In respect of the flying object controller according to supplemental note 1, when the judgment unit judges that the slider has contacted or is likely to contact the rotor shaft, when the actuator is contracting, the control unit may slow down the contracting speed of the shortest actuator, which is an actuator in a shortest state out of the plurality of actuators, or stop the shortest actuator. According to such a configuration, the contact between the rotor shaft and the slider can be suppressed.

(Supplemental Note 6)

In respect of the flying object controller according to supplemental note 1, the control unit may set a target length for each of the plurality of actuators when varying the pitch angle of the blade, and until the judgment unit judges that the slider has contacted or is likely to contact the rotor shaft, the control unit may individually control the plurality of actuators in a manner so that the length of each of the plurality of actuators is equal to the target length. According to such a configuration, it is possible to quickly adjust the pitch angle of the blade while suppressing the contact between the rotor shaft and the slider.

(Supplemental Note 7)

In respect of the flying object controller according to supplemental note 1, when the corrective control is not performed, the control unit may expand or contract the actuator at the maximum speed of the actuator. According to such a configuration, it is possible to quickly adjust the pitch angle of the blade while suppressing the contact between the rotor shaft and the slider.

(Supplemental Note 8)

The flying object includes the flying object controller according to any one of supplemental notes 1 to 7. According to such a configuration, the contact between the rotor shaft and the slider can be suppressed.

(Supplemental Note 9)

A method for controlling a flying object equipped with an actuator for adjusting a pitch angle of a blade provided at a rotor, the method comprising: a moving step for moving a slider along a rotor shaft provided at the rotor by expanding and contracting a plurality of the actuators; a judgment step for judging whether the slider has contacted or is likely to contact the rotor shaft; and a correction step for performing corrective control that prevents the slider from contacting the rotor shaft when it is judged in the judgment step that the slider has contacted or is likely to contact the rotor shaft. According to such a configuration, the contact between the rotor shaft and the slider can be suppressed.

(Supplemental Note 10)

A program causes a computer to execute the method according to supplemental note 9. According to such a configuration, the contact between the rotor shaft and the slider can be suppressed.

(Supplemental Note 11)

A non-transitory computer-readable storage medium stores the program according to supplemental note 10. According to such a configuration, the contact between the rotor shaft and the slider can be suppressed.

Note that the present invention is not limited to the above disclosure, and various modifications are possible without departing from the essence and gist of the present invention.

The invention claimed is:

1. A flying object controller for controlling a flying object equipped with an actuator for adjusting a pitch angle of a blade provided at a rotor, the flying object controller comprising one or more processors that execute computer-executable instructions stored in a memory, wherein the one or more processors execute the computer-executable instructions to cause the flying object controller to:

control a movement of a slider along a rotor shaft provided at the rotor by expanding and contracting a plurality of the actuators;

judge whether the slider has contacted the rotor shaft; and perform corrective control that stops the slider contacting the rotor shaft, when judged that the slider has contacted the rotor shaft.

2. A flying object controller for controlling a flying object equipped with an actuator for adjusting a pitch angle of a blade provided at a rotor, the flying object controller comprising one or more processors that execute computer-executable instructions stored in a memory, wherein the one or more processors execute the computer-executable instructions to cause the flying object controller to:

control a movement of a slider along a rotor shaft provided at the rotor by expanding and contracting a plurality of the actuators;

judge whether a condition exists, the condition being that a difference between a length of a longest actuator, which is an actuator in a longest state out of the plurality of actuators, and a length of a shortest actuator, which is an actuator in a shortest state out of the plurality of actuators, is equal to or larger than a predetermined length; and perform corrective control that stops the slider from contacting the rotor shaft, when the condition is judged to exist.

3. A flying object controller for controlling a flying object equipped with an actuator for adjusting a pitch angle of a blade provided at a rotor, the flying object controller comprising one or more processors that execute computer-executable instructions stored in a memory, wherein the one or more processors execute the computer-executable instructions to cause the flying object controller to:

control a movement of a slider along a rotor shaft provided at the rotor by expanding and contracting a plurality of the actuators;

judge whether a condition exists, the condition being that an inclination of the slider with respect to the rotor shaft is equal to or greater than a predetermined angle; and perform corrective control that stops the slider from contacting the rotor shaft, when the condition is judged to exist.

4. The flying object controller according to claim 1, wherein in a case that the flying object controller judges that the slider has contacted the rotor shaft, when the actuators are expanding, the one or more processors cause the flying object controller to slow down an expanding speed of a longest actuator, which is an actuator in a longest state out of the plurality of actuators, or to stop the longest actuator.

5. The flying object controller according to claim 1, wherein in a case that the flying object controller judges that the slider has contacted the rotor shaft, when the actuators are contracting, the one or more processors cause the flying object controller to slow down a contraction speed of a shortest actuator, which is an actuator in a shortest state out of the plurality of actuators, or to stop the shortest actuator.

6. The flying object controller according to claim 1, wherein the one or more processors cause the flying object controller to set a target length for each of the plurality of actuators when varying the pitch angle of the blade, and until the flying object controller judges that the slider has contacted the rotor shaft, the one or more processors cause the flying object controller to individually control the plurality of actuators in a manner so that a length of each of the plurality of actuators is equal to the target length.

7. The flying object controller according to claim 1, wherein in a case that the corrective control is not performed, the one or more processors cause the actuator to be expanded and contracted at a maximum speed of the actuator.

8. A flying object comprising the flying object controller according to claim 1.

9. The flying object controller according to claim 2, wherein in a case that the flying object controller judges that the condition exists, when the actuators are expanding, the one or more processors cause the flying object controller to slow down an expanding speed of a longest actuator, which is an actuator in a longest state out of the plurality of actuators, or to stop the longest actuator.

10. The flying object controller according to claim 2, wherein in a case that the flying object controller judges that the condition exists, when the actuators are contracting, the one or more processors cause the flying object controller to slow down a contraction speed of a shortest actuator, which is an actuator in a shortest state out of the plurality of actuators, or to stop the shortest actuator.

11. The flying object controller according to claim 2, wherein the one or more processors cause the flying object controller to set a target length for each of the plurality of actuators when varying the pitch angle of the blade, and until the flying object controller judges that the condition exists, the one or more processors cause the flying object controller to individually control the plurality of actuators in a manner so that a length of each of the plurality of actuators is equal to the target length.

12. The flying object controller according to claim 2, wherein in a case that the corrective control is not performed, the one or more processors cause the actuator to be expanded and contracted at a maximum speed of the actuator.

13. A flying object comprising the flying object controller according to claim 2.

14. The flying object controller according to claim 3, wherein in a case that the flying object controller judges that the condition exists, when the actuators are expanding, the one or more processors cause the flying object controller to slow down an expanding speed of a longest actuator, which is an actuator in a longest state out of the plurality of actuators, or to stop the longest actuator.

15. The flying object controller according to claim 3, wherein in a case that the flying object controller judges that the condition exists, when the actuators are contracting, the one or more processors cause the flying object controller to slow down a contraction speed of a shortest actuator, which is an actuator in a shortest state out of the plurality of actuators, or to stop the shortest actuator.

16. The flying object controller according to claim 3, wherein the one or more processors cause the flying object controller to set a target length for each of the plurality of actuators when varying the pitch angle of the blade, and until the flying object controller judges that the condition exists, the one or more processors cause the flying object controller to individually control the plurality of actuators in a manner so that a length of each of the plurality of actuators is equal to the target length.

17. The flying object controller according to claim 3, wherein in a case that the corrective control is not performed, the one or more processors cause the actuator to be expanded and contracted at a maximum speed of the actuator.

18. A flying object comprising the flying object controller according to claim 3.

* * * * *